Oct. 29, 1940. A. O. WILLIAMS Re. 21,612

SPRING UNIT

Original Filed June 2, 1938

INVENTOR.
ALFRED O. WILLIAMS.
BY Walter E. Schirmer
ATTORNEY.

Reissued Oct. 29, 1940 Re. 21,612

UNITED STATES PATENT OFFICE 21,612

SPRING UNIT

Alfred O. Williams, Battle Creek, Mich., assignor to Clark Equipment Company, Battle Creek, Mich., a corporation of Michigan Original No. 2,205,586, dated June 25, 1940, Serial No. 211,417, June 2, 1938. Application for reissue August 31, 1940, Serial No. 355,009

10 Claims. (Cl. 267—4)

This invention relates to spring units, and more particularly is directed to spring units for use on rail car trucks as resilient supports for center bolsters, wheel journals or the like.

I am familiar with various types of spring units employed in trucks of this nature now on the market, including the friction type of shock absorbing unit, the dash pot type and the rubber spring type in which steel plates are embedded in rubber to produce progressive loading of the rubber as the load increases.

The present invention has for one of its primary objects the provision of a spring unit assembly, which overcomes the disadvantages inherent in previous assemblies with which I am familiar, inasmuch as it eliminates the use of rubber as a spring loading member, and also eliminates the dash pot or expanding frictional systems previously employed.

In connection with this type of spring unit I may also employ a spring structure which in itself is so designed as to insure a certain amount of lateral stability, thus accommodating to some extent the lateral thrust loads imposed on the spring connection between the bolster or side frame members and the wheel and axle assemblies, thereby preventing swaying of the car body due to irregularities in the track surface.

Another feature of the present invention is the arrangement of the structure in such manner as to facilitate inspection, maintenance and repair of the unit and to permit ready removal and replacement of certain of the elements thereof which are subjected to the greatest wear.

It is another feature of the present invention to provide a construction in which the parts require no special or intricate designing or machining, and are capable of mass production which insures economy in manufacture, while at the same time being of simple form so as to facilitate assembly of the parts in the truck.

Other objects and advantages of the present invention, as well as the details of construction and assembly of the various parts, will be more apparent to those skilled in the art from the following detailed description, taken in conjunction with the accompanying drawing forming a part hereof.

Figure 1:
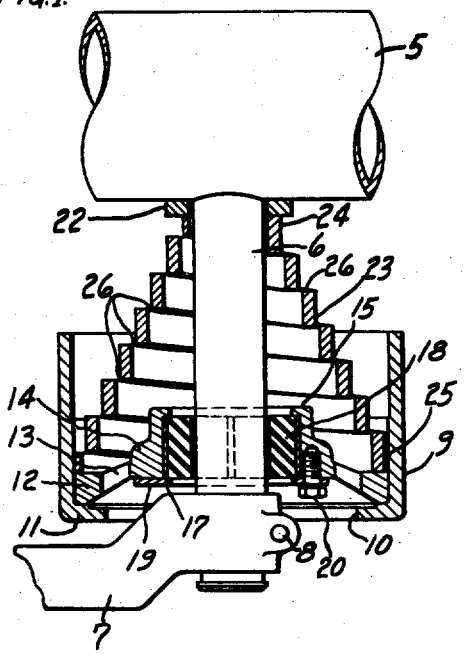
Figure 1 is a sectional view through a spring unit embodying the present invention.

Referring now in detail to the drawing, I have indicated a side frame member or the like for a rail car truck at 5, which is provided with depending posts 6 of tubular form adjacent opposite ends thereof, and to which are secured journal bars 7 by means of split clamps as indicated at 8.

The axle assembly of the truck (not shown) is adapted to have formed thereon, or carried thereby, the spring pots 9, each of which constitutes a substantially cup shaped member having the enlarged apertures 10 formed in the base thereof providing clearance for the angled end of the journal bars 7 and for the center post 6. These pots 9 may be cast integral with certain portions of the axle housing assembly, or may be bolted thereto as described.

Disposed within the spring pots 9 and resting upon the inturned flange 11 which defines the apertures 10 is a cast metal spider 12 which has an annular ring portion seating on the inner surface of the flange, and is provided with inwardly radially extending arms 13 connected together by an annular ring or collar portion 14 which surrounds the center post 6 and is radially spaced therefrom. The collar portion 14 is provided at its upper end with the inturned flange 15 forming a seat for receiving the buffer ring 17. This ring 17 comprises a metal plate which fits securely within the bore of the collar 14, and which has vulcanized thereto the annular pad of rubber 18 which fits about and has slight clearance with respect to the center post 6. The buffer ring assembly 17 is maintained in position by the retaining plate 19 which is secured by means of bolts 20, or in any other suitable manner to the bottom face of the central collar portion 14 of the spider 12.

Adjacent the frame member 5, the post 6 is provided with a thrust plate or washer 22 which encircles the same and bears against the surface of the frame member 5. This plate serves as a seat for the small end of a spirally coiled spring 23 which encircles the post 6, and at its large end has seating engagement upon the annular ring portion of the spider 12 which in turn is seated upon the flange 11 of the spring pot.

It will be noted that the spring 23 is rectangular in section and is formed spirally to extend from its small end 24 in ever increasing convolutions to the large end 25 seating on the spider. In order to afford lateral stability to the spring unit to prevent any relative cocking of the axes of the spring pot 9 with respect to the post 6, I preferably form the spring 23 so that its successive convolutions partially overlap or are nested within the next succeeding larger convolution. This affords lateral abutment of the convolutions as indicated at 26, and thus prevents any tendency of the spring 23 to cock laterally due to eccentric loading.

In the operation of the structure thus far shown and described, it will be apparent that relative movement between the spring pot 9 and the frame member 5 is cushioned by the spring 23 which tends to be compressed under such loading. Also, any tendency for relative lateral movement of the post with respect to the spring pot 9 is resisted by the buffer ring assembly 17 which has the resilient pad of rubber 18 adapted to laterally cushion the post 6 under such conditions. This affords a shock-absorbing means, and also assists in providing for lateral stability of the unit independently of the abutment of the successive convolutions of the spring 23.

It will be noted that due to the enlarged aperture 10 in the spring pot, it is relatively easy to inspect the spring unit assembly, and if necessary, the construction facilitates the removal and replacement of the buffer ring assembly by merely releasing the journal bar 7 and the annular plate 19 whereby the assembly may be slipped out of position and repaired or a new one placed in position.

I contemplate as a further feature of the present invention, the making of the buffer ring assembly in two halves, split normal to the longitudinal extent of the truck whereby it is unnecessary to require removal of the journal bar 7 from the post 6, as release of the plate 19 will allow the pad sections to be disengaged and removed from the spider 12 and new ones inserted in place thereof.

Figure 2:
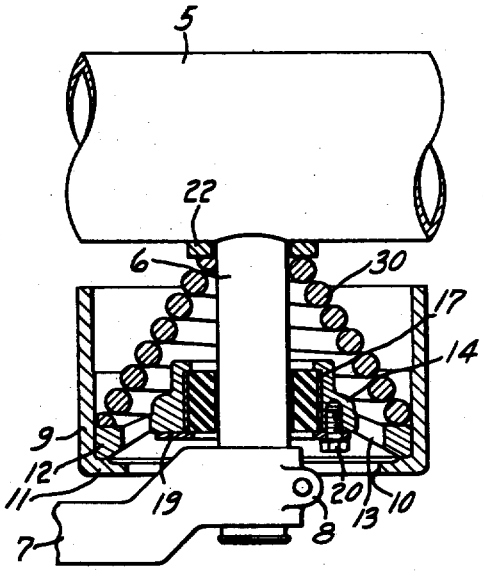
Figure 2 is a corresponding view of a similar unit employing a different type of spring.

Considering now the embodiment of the invention shown in Figure 2, similar reference numerals indicate corresponding parts inasmuch as the structure shown in Figure 2 is essentially the same as that shown in Figure 1 with the exception that the spring 23 is replaced by the spring indicated at 30.

It will be apparent that the buffer ring 17 shown in Figure 2 accommodates vertical movement of the post 6 relative to the spring pot 9, but provides a lateral cushion for preventing relative lateral movement between the post and the pot 9. Here again the buffer ring is readily replaceable for inspection or replacement, and if desired, might be made in two halves in a manner similar to that shown in Figure 1. It is to be pointed out, however, that, as shown in Figure 2, the spring is in its completely compressed position and that under normal loads, the convolutions of the spring 30 would be spaced axially a distance somewhat greater than that shown.

Figure 3:
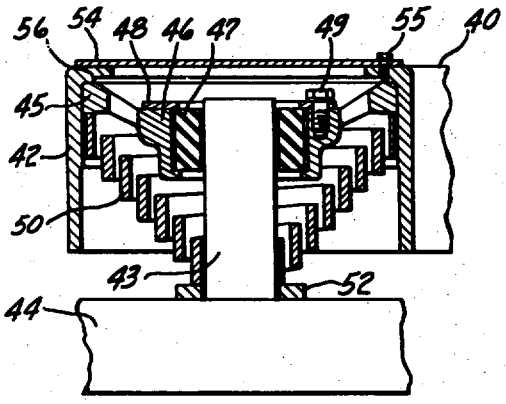
Figure 3 is a sectional view showing a modified arrangement of the spring unit for use in certain types of trucks.

Considering now the form of the invention which I have disclosed in Figure 3, this modification is employed in situations where a bolster is to be resiliently mounted upon the side frame members of a rail truck or the like.

In this form of the invention, a bolster member 40 is provided which preferably has a pair of inverted spring pots 42 formed at the opposite ends thereof which are adapted to extend over posts 43 carried by suitable frame members 44 forming part of the frame of the truck. The frame members 44 in turn are carried upon the axles of the truck (not shown), whereby the bolster is mounted for vertical movement relative thereto. The spring pots 42 are provided with spiders 45 corresponding to the spiders 12 of Figures 1 and 2 which have the central collar portion 46 carrying the buffer ring assembly 47 held in place by the retaining plate 48 bolted or otherwise secured to the collar portion, as by means of the bolts 49. Disposed within the spring pot is a spirally coiled spring member 50, preferably of substantially rectangular section which at its smaller end bears against a thrust plate 52 carried on the frame 44 at the lower end of the post 43, and at its larger end the spring is biased against the outer peripheral surface of the spider 45. To enclose the spring unit, I preferably provide a closure plate 54 which is bolted or otherwise secured as by means of the studs 55 to the radially extending flange 56 of the spring pot 42. To replace the buffer ring assembly 47, it is only necessary to remove the plate 54 and the plate 48 whereby the entire buffer ring assembly may be removed and a new one substituted therefor.

It will be noted that the successive convolutions of the spring 50 over-lie each other in such manner that any tendency to lateral cocking between the spring pot and the post will be resisted. However, in this form of the invention, the convolutions do not actually abut laterally, and consequently there is no possibility of frictional engagement therebetween which might result in wearing of the lateral surfaces of the spring 50.

Figure 4:
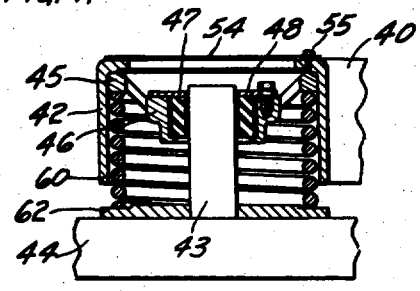
Figure 4 is a sectional view corresponding to Figure 3 of a modified type of spring assembly.

The embodiment of the invention disclosed in Figure 4 is similar to that shown in Figure 3, except that the helically coiled spring 60 has been substituted for the spring 50. In this embodiment of the invention also, a much wider thrust plate 62 must be employed which preferably is provided with a shouldered pilot for centering the spring 60.

In this form of the invention the spring 60 acts as a vertical cushion between the spring pot 42 and the frame member 44, while the buffer ring assembly 47 serves as a resilient lateral cushioning member for preventing any relative lateral movement between the spring pot 42 and the post 43.

It is believed obvious that with the present construction I have provided a simplified spring unit which may be easily constructed and assembled, and which possesses distinct advantages in operation and length of service over prior types of such units, and can be produced at greatly reduced cost.

I am aware that various changes may be made in certain details of the construction herein shown and described, and I therefore intend to be limited only insofar as defined by the scope and spirit of the appended claims.

I claim:

1. In combination, a spring assembly for a rail car truck comprising relatively movable alined center post and spring pot members, said post member having a thrust plate adjacent one end thereof, said spring pot member having an apertured base through which the opposite end of said post member extends, a spider seated within said pot member and having a resilient buffing ring encircling said post member adjacent said opposite end thereof, a flange on said spider limiting axial movement of said ring in one direction, means detachably secured to said spider for retaining said buffing ring against axial movement in the opposite direction, and a coiled spring biased between said thrust plate and said spider and confined laterally by said pot member.

2. A spider for centering a center post relative to a spring pot comprising a peripheral portion seated in the spring pot, an axially offset central hub portion radially spaced about said post, said hub portion having an inwardly directed flange at one end, a rubber sleeve in said hub portion seated on said flange and embracing said post, and a detachable plate maintaining said sleeve against axial movement.

3. In combination, a spring assembly comprising a spring pot member and an alined center post member relatively movable with respect to each other, said post member having a thrust plate adjacent one end thereof, said spring pot member having a radially inturned base portion, a spider peripherally seated on said base and having a flanged hub portion encircling said post, a buffer ring in said hub portion held against axial movement in one direction by the hub flange, detachable means secured to the spider retaining the ring against axial movement in the opposite direction, and a coiled spring biased between said thrust plate and the spider periphery.

4. A spring assembly for a rail truck having a frame member provided with a depending center post, an axle member having spring seating means about said post, spring means biased between said frame member and said seating means for cushioning only vertical reactions therebetween, means forming an annulus about said post and secured against lateral movement relative to said seating means, a resilient buffer ring in said annulus, and means detachably securing said ring in said annulus, said ring freely receiving said post for vertical movement but restraining said post against lateral movement in any direction.

5. In combination, in a rail truck, a frame member having a depending post, a housing member encircling said post below said frame member, spring means biased between said members for receiving vertical reactions only between said members, means supported against movement relative to said housing member including a center portion forming an annulus about said post, and a resilient member in said annulus allowing free vertical movement of said post relative thereto but restraining excessive lateral movement of said post, whereby said resilient member is subject only to lateral loading.

6. The combination of claim 5 wherein said resilient member comprises a rubber sleeve encircling said post and having slight clearance thereabout.

7. The combination of claim 5 wherein said annulus has means detachably secured thereto for holding said resilient member against axial movement.

8. Means for centering a depending center post of a rail truck frame member against lateral movement relative to a spring pot, comprising a body member secured against lateral movement relative to said pot and having a central hub portion surrounding said post and radially spaced therefrom, a resilient sleeve in said hub portion encircling said post and having slight clearance thereabout, means on said hub portion forming a seat for one end of said sleeve, and detachable means maintaining said sleeve against said seat.

9. In combination, a spring receiving member and an axially centered post member relatively movable with respect to each other, said post member having a thrust plate at one end thereof spaced vertically from said first-named member, spring means therebetween for cushioning relative vertical movement, means secured against lateral movement relative to said first-named member and forming a hub portion spaced radially about said post member, and a resilient buffer sleeve in said hub portion restraining said post member against lateral movement but providing for free vertical movement of said post member therethrough upon relative movement of said members.

10. The combination of claim 9 wherein said hub portion has detachable means securing said sleeve against axial movement therein.

ALFRED O. WILLIAMS.